United States Patent [19]
Nuss

[11] Patent Number: 5,238,170

[45] Date of Patent: Aug. 24, 1993

[54] DEVICE FOR WELDING THE ENDS OF ELECTRICAL CONDUCTORS

[75] Inventor: Lothar Nuss, Offenbach, Fed. Rep. of Germany

[73] Assignee: Stapla Ultraschalltechnik GmbH, Kelsterbach, Fed. Rep. of Germany

[21] Appl. No.: 931,163

[22] Filed: Aug. 17, 1992

[30] Foreign Application Priority Data

Aug. 30, 1991 [DE] Fed. Rep. of Germany ....... 4128858

[51] Int. Cl.⁵ ............................................. B23K 20/10
[52] U.S. Cl. ...................................... 228/1.1; 29/872; 156/580.2
[58] Field of Search .................... 228/1.1; 29/572, 573; 156/73.2, 580.2

[56] References Cited

U.S. PATENT DOCUMENTS

| | | | |
|---|---|---|---|
| 4,032,382 | 6/1977 | Obeda | 228/1.1 X |
| 4,736,881 | 4/1988 | Niebuhr | 228/1.1 |
| 4,799,614 | 1/1989 | Welter et al. | 228/1.1 |
| 4,842,671 | 6/1989 | Nuss | 228/1.1 X |

Primary Examiner—Kenneth J. Ramsey
Attorney, Agent, or Firm—Anderson Kill Olick & Oshinsky

[57] ABSTRACT

A device is described for welding the ends of electrical conductors, especially strand ends, by means of ultrasonics which comprises a sonotrode, provided with a plurality of different projections, and an anvil, associated with the sonotrode, which anvil is provided with a plurality of different or like recesses which, together with the sonotrode projections, constitute compaction spaces for the strand ends. The anvil is disposed with its longitudinal axis coaxially with the longitudinal axis of the sonotrode, and the cross-sections of the compaction spaces can be simultaneously varied by rotation of the anvil relative to the sonotrode about the common longitudinal axis, so that a plurality of strand ends can be simultaneously welded by only one anvil. Several alternatives for the rotational drive of the anvil are also described.

18 Claims, 3 Drawing Sheets

DEVICE FOR WELDING THE ENDS OF ELECTRICAL CONDUCTORS

FIELD OF THE INVENTION

The present invention relates to a device for welding the ends of electrical conductors, preferably strand ends, by ultrasonics.

BACKGROUND OF THE INVENTION

In a known prior art device of this class (DE 31 51 151 C2), both a sonotrode and an anvil are rotatably journalled, each about their own longitudinal axis. These axes are perpendicular to each other and are spaced apart, in order that the various sonotrode projections and the corresponding anvil recesses can be adjusted relative to one another for forming different compaction spaces. Only one compaction space can be formed each time, with the result being that only one conductor end weld can be performed in each operation. If conductor ends of different cross-sectional dimensions are to be compacted and welded, then the sonotrode and the anvil must be reset relative to each other on each occasion.

An arrangement is already known in the prior art (DE 31 51 151 C2, FIGS. 3 and 4), by which two conductors can be welded simultaneously in different compaction spaces in one operation. However, for this purpose two separate anvils must be associated with a sonotrode rotatable about its longitudinal axis. These anvils are each rotatably journalled about their own longitudinal axis, with the result being that the device not only becomes larger and more expensive, but also allows for the simultaneous welding of only those types of welds which can be carried out on adjacent sonotrode surfaces on one sonotrode projection.

SUMMARY OF THE INVENTION

According to the basic concept of the present invention, a sonotrode and an anvil are disposed coaxially with respect to their longitudinal axes so that rotations of the anvil relative to the sonotrode have a simultaneous effect on all compaction spaces formed between the sonotrode and the anvil. Welds, therefore, not only can be made in one compaction space, but also can be carried out simultaneously in several or even all of the compaction spaces present. Compaction spaces of the same size, and also compaction spaces of different sizes, may be provided in the suitable relative position for the desired purpose.

For compacting the conductor ends laid in the opened compaction spaces, the anvil is rotated about the sonotrode before the ultrasonic welding operation commences. The further compaction of the conductor ends or strand ends, situated in the compaction spaces, which occurs during the ultrasonic action, is facilitated by a slight continuation of the anvil rotation in the same direction. Subsequent to the welding operation, the anvil is rotated back in the opposite direction in order to release the welded strand ends. By the concentric arrangement of the sonotrode and the anvil, a very compact and convenient ultrasonic welding device is obtained which can be operated with one hand. Also, because of the slender form made possible by the arrangement of this invention, it can also be introduced into locations that otherwise would be difficult to access, for example, inside a switchgear cabinet.

The device of the present invention comprises a sonotrode which is provided with a plurality of different projections, and an anvil, which is associated with the sonotrode and which is rotatably journalled about its own longitudinal axis. The anvil is provided with a plurality of different recesses which, together with the sonotrode projections, constitute different compaction spaces for the conductor ends. Two mutually adjoining surfaces of the sonotrode projections and two mutually adjoining surfaces of the anvil recesses form the boundaries of a compaction chamber. The cross section of the compaction chamber can be varied by moving the anvil relative to the sonotrode for the introduction and compaction of the conductor ends to be welded and for the removal of the welded conductor ends. The anvil is disposed with its longitudinal axis coaxial with the longitudinal axis of the sonotrode. The cross-sections of the compaction spaces can be varied by the rotation of the anvil relative to the sonotrode about the common longitudinal axis.

One advantageous embodiment of the sonotrode and the anvil is achieved in which the anvil is constructed substantially as a hollow cylinder and is rotatably journalled about its longitudinal axis, and having accommodated within it, the stationary sonotrode. The hollow cylinder is provided with groove-shaped recesses which extend parallel to the longitudinal axis, and into each of which recesses, a rib-shaped sonotrode projection, which runs parallel to the longitudinal axis, engages. The sonotrode projection projects from the outer circumferential surface of the sonotrode, the inner circumferential surface of the anvil, and the outer circumferential surface of the sonotrode. The above elements are associated with each other in a contact-free manner by a narrow gap. The width of the groove-shaped recesses is several times greater than the width of the rib-shaped sonotrode projections. In this embodiment, the anvil is a hollow cylinder closed at its periphery, in the central space of which the sonotrode is accommodated. A plurality of compaction spaces are arranged in a circle between the outer periphery of the sonotrode. The inner periphery of the anvil can then be accommodated, according to the diameter dimensions of the sonotrode and the anvil, along with the cross-sectional dimensions of the desired compaction spaces.

The boundaries of the individual compaction spaces formed by the anvil and the sonotrode surfaces are advantageously arranged so that each compaction space is bounded by a lateral face of a sonotrode projection, the groove lateral face of the anvil recess opposite this lateral face, the outer circumferential surface of the sonotrode adjoining the lateral face of the sonotrode projection, and the groove base surface of the anvil recesses which adjoin the groove lateral face. Compaction spaces of different cross-sections can then be obtained by the distances between the lateral faces of the sonotrode projections and the associated groove lateral faces of the anvil recesses and/or the height of the sonotrode projections. The depth of the anvil recesses associated with each are of different sizes in each relative rotational position of the anvil and the sonotrode, in order to achieve compaction spaces of different cross-sections.

The compacting of the strand ends can be improved by the particular shape of the cooperating boundary surfaces of the compaction spaces in that the lateral faces of the sonotrode projections and the groove lateral faces opposite them are shaped to a concave curvature in the radial direction. This is referred to as the common longitudinal axis of the anvil and the sonotrode.

In one embodiment of the device, in the region of the compaction spaces, the outer circumferential surface of the sonotrode adjoining the lateral faces of the sonotrode projections and/or the groove base surfaces of the anvil, adjoining the groove lateral faces, are curved inwardly and outwardly, respectively, as a deviation from the cylindrical shape in such a manner that the radial gap widths between the anvil and the sonotrode become smaller as the groove lateral faces approach the lateral faces of the sonotrode projections and become larger in the reverse direction. In this embodiment, the result is advantageously achieved that the compaction spaces, in order to facilitate the removal of the welded strand ends, not only increase in size in the circumferential direction of the sonotrode as the anvil is rotated back, but also increases in a specific manner in the radial direction. Furthermore, the gap width between the sonotrode and the anvil, in the region of the compaction spaces, is advantageously made smaller as the anvil is rotated in the compacting direction, so that individual wires of the strand ends cannot be forced into the gap during compaction.

The compaction spaces are open at the end of the device. Especially good access to all compaction spaces is obtained if the device is constructed with the outer end faces of the anvil and the sonotrode lying in one common plane.

If the anvil is journalled with its outer circumferential surface by means of rolling contact bearings rotatably on a casing which surrounds the anvil, and which also completely surrounds the sonotrode, an easy running and precise rotational mounting of the anvil on the casing of the device is assured. This is advantageous as the end face of the casing does not project axially beyond the common end face of the anvil and the sonotrode.

The force action upon the anvil, which causes the rotation of the anvil, can take place in a simple and effective manner, in that an actuating member, which projects beyond the outer circumference of the anvil, is fixed to the anvil, to which there is articulated an operating element which is mounted on the casing for rotating the anvil about its longitudinal axis.

The device may be constructed in a preferred embodiment wherein the operating element is a two-armed hand lever, pivotally mounted on the casing, and of which the force arm bears against the casing via a restoring spring and wherein a load arm, which acts on the actuating member, is of a flexible construction. In this embodiment, the anvil is rotated relative to the sonotrode solely by a lever-assisted manual force, so that the device requires only the connecting lead for the sonotrode and the switching lines, and does not require a pneumatic or hydraulic connection.

By using a spring-loaded construction of the load arm of the two-armed hand lever to form the operating element, the result may advantageously be achieved, in conjunction with the embodiment wherein, when a conductor end is laid in at least one of the compaction spaces, a force arm of the hand lever prestresses the flexibly constructed load arm, before the force arm comes to the end of its travel on a switch, which is mounted on the casing, for the activation of the ultrasonic action. In this manner, upon the complete pivoting of the hand lever into its limiting position, which action triggers the activation of the ultrasonic effect, the spring force stored in the resiliently constructed load arm ensures a further rotational drive of the anvil for compacting the strand ends during the welding operation.

In another embodiment of the operating element, it may also be provided that a pneumatically or hydraulically actuated piston is articulated to the actuating member. In this manner, the actuating member of the anvil is pneumatically or hydraulically operated.

Alternatively, the rotational drive of the anvil may take place also through a motor-driven drive gearing arrangement wherein the anvil is connected concentrically to a set of teeth which are force-transmittingly connected to it, and with which a motor-driven drive element engages, and further wherein the set of teeth is a wormgear set of teeth and the drive element is a drive worm.

Accordingly, it is an object of the present invention to provide a simple and easily used device for welding the ends of electrical conductors by which more than two conductor end welds are rendered possible simultaneously with the use of only one anvil.

Other objects and advantages will be made apparent to those skilled in the art upon a review of the Description of the Preferred Embodiment taken in conjunction with the drawings which follow.

DESCRIPTION OF THE PREFERRED EMBODIMENT

Figure 1:
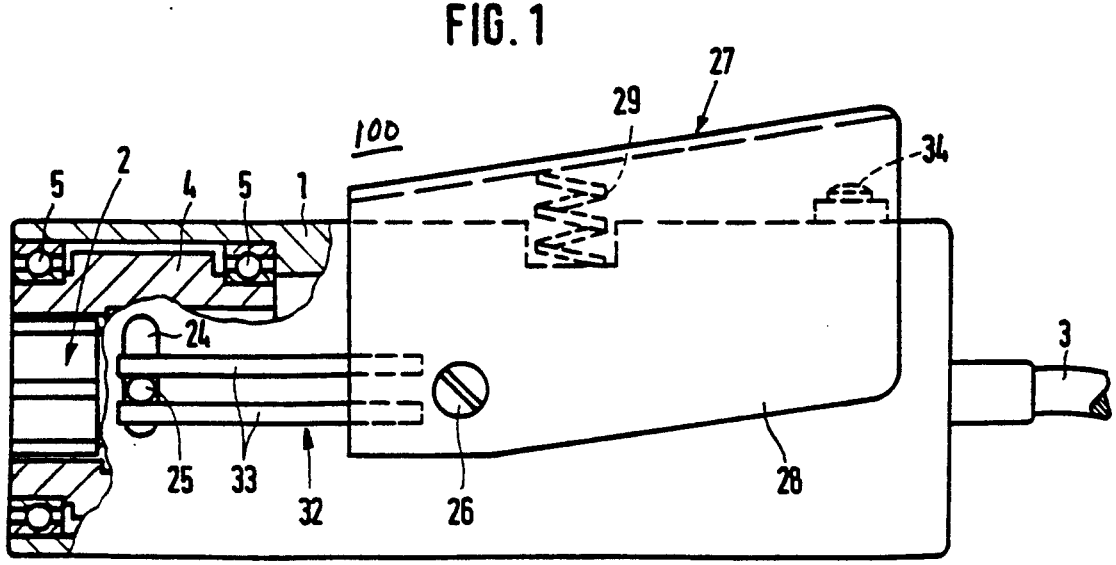
FIG. 1 illustrates a partly cut away side view of the device, which is the subject of the present invention.
Figure 2:
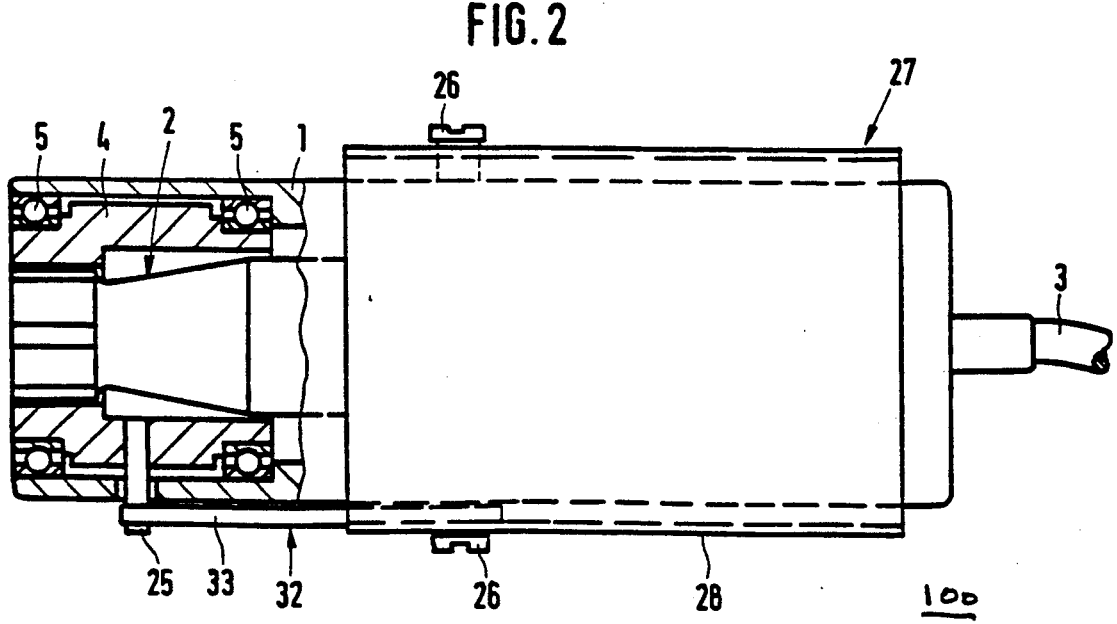
FIG. 2 illustrates a partly cut away plan view of the device of FIG. 1.
Figure 3:
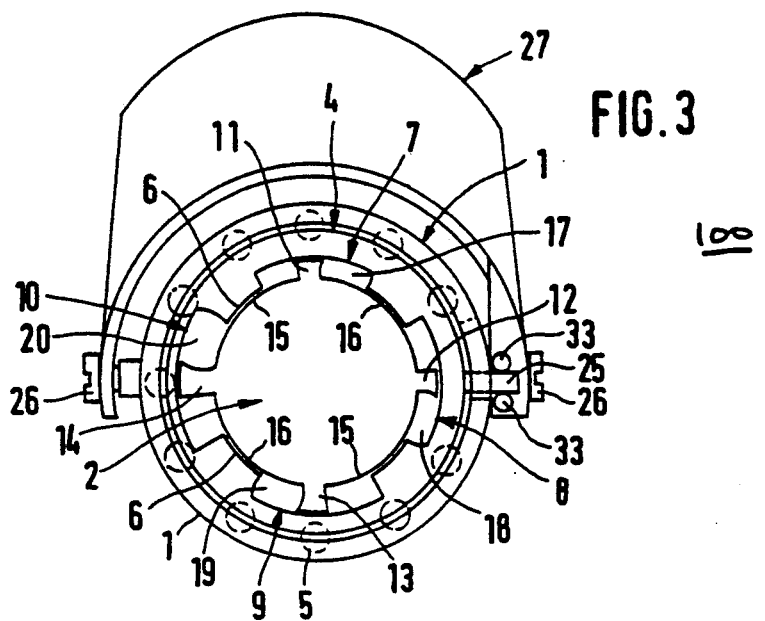
FIG. 3 illustrates a front view of the device according to FIGS. 1 and 2.

FIGS. 1, 2 and 3 illustrate the device of the present invention which is denoted generally by the reference numeral 100. As can be seen from FIGS. 1 to 3, the ultrasonic welding device possesses a cylindrical casing 1, in which the sonotrode 2 is mounted coaxially and immovably. The sonotrode 2, however, is able to vibrate in the longitudinal direction. The power line for the sonotrode 2 and the operating lines are led out from the rear end of the casing 1 at location 3. In the forward region of the casing the anvil 4, which is constructed substantially as a hollow cylinder and which is journalled rotatably about its longitudinal axis, is housed. The anvil 4 is mounted coaxially to the longitudinal axis of the sonotrode 2 and of the casing 1 and is journalled rotatably by its external peripheral surface via rolling contact bearings 5 on the casing 1 surrounding it. The casing 1, in addition to the cylindrical outer shape shown, may possess any suitable external shape or profile. By the roller bearings 5, an easy running and an accurate rotational bearing of the anvil 4 is obtained, with the result, on the one hand, that only small frictional forces need to be overcome for the rotational movements of the anvil while, on the other hand, assurance is provided that, in any relative position between the sonotrode 2 and the anvil 4, the narrow gap required between these two elements is maintained.

The anvil 4 is provided with a stepped bore, composed of two regions having different diameters, of which the front region has a smaller diameter which is intended for forming the compaction spaces, to be described below, while the inner region, which is of a larger diameter, surrounds the shaft of the sonotrode 2 concentrically and without contact. All of the references given below to the central bore of the anvil 4 and to the associated internal circumferential surface relates to the forward region of the stepped bore of the anvil 4, which in this embodiment is of a substantially smaller diameter. Correspondingly, all indications referring to the sonotrode 2 relate to the forward head region of the sonotrode 2, which is situated inside the stepped bore section of the smaller diameter.

As can be seen from FIG. 3, the anvil 4 is provided, starting from its internal circumferential surface 6, with groove-shaped recesses 7 to 10, which extend parallel to the longitudinal axis, into each of which recesses there engages a rib-shaped sonotrode projection 11 to 14 which extends parallel to the longitudinal axis and projects out from the circumferential surface 15 of the sonotrode 2. The width of the groove-shaped recesses 7 to 10, is in each case several times larger than the width of the rib-shaped sonotrode projections 11 to 14. The internal circumferential surface 6 of the anvil 4 and the external circumferential surface 15 of the sonotrode 2 are associated with each other without contact via a narrow gap 16.

In the example shown, four anvil recesses along with four corresponding sonotrode projections, are provided so that four compaction spaces result. The number of recesses and sonotrode projections and thus the number of compaction spaces may, however, be larger or smaller. Each compaction space 17 to 21, as explained below with additional reference to FIGS. 4 and 5 for the compaction space 17, is bounded by four surfaces. The boundary surfaces include one lateral face 21 of the sonotrode projection 11, the groove lateral face 22 opposite to this lateral face 21 of the anvil recess 7, the external circumferential surface 15 of the sonotrode 2, which adjoins the lateral face 21 of the sonotrode projection 11, and the groove base surface 23 of the anvil recess 7, which adjoins the groove lateral surface 22.

The anvil recesses 7 to 10 and the sonotrode projections to 14 may be so constructed that, in each relative rotated position of the anvil 4 and the sonotrode 2, in order to achieve compaction spaces 17 to 20 of different cross-sections, the distances between the lateral faces 21 of the sonotrode projections 11 to 14 and the associated groove lateral faces 22 of the anvil recesses 7 to 10 and/or the height of the sonotrode projections 11 to 14 and the depth of the associated anvil recesses 7 to 10, are of different sizes. This is illustrated in FIG. 3. In each case, the circumferential distances between the lateral faces 21 and the groove lateral faces 22 should be selected so that the maximum compaction of the strand ends, laid in the compaction spaces 17 to 20, takes place simultaneously in all of the compaction spaces.

The lateral faces 21 of the sonotrode projections 11 to 14 and the groove lateral faces 22 opposite thereto, referred to as the common longitudinal axis of the anvil 4 and the sonotrode 2, are formed to a concave curvature in the radial direction. As can be seen from FIGS. 4 and 5, which have been simplified for the sake of clarity, in the region of the compaction spaces 17 to 20, the external circumferential surface 15 of the sonotrode 2, which adjoins the lateral faces 21 of the sonotrode projections 11 to 14, and/or the groove base surfaces 23 of the anvil 4, which adjoins the groove lateral faces 22, are curved inwardly and outwardly, respectively, as a departure from the cylindrical shape.

In the example shown, both the external circumferential surface 15 and also the groove base surface 23 are curved in a departure from the cylindrical shape, as the dot-and-dash lines indicate. The deviations from the cylindrical shape do not begin directly at the lateral faces 21 or groove lateral faces 22, respectively, but in each case, after a cylindrical portion, the arc length of which is smaller than the arc length of the opened compaction spaces (see FIG. 4), but larger than the arc length of the closed compaction spaces (see FIG. 5). The arrangement is such that the radial gap widths between the anvil 4 and the sonotrode 2, as the groove lateral faces 22 approach the lateral faces 21 of the sonotrode projections 11 to 14, become smaller, and conversely become larger in the reverse direction. As a consequence, on the one hand, as the compaction of the strand ends increases, the individual wires are prevented from being displaced into the gap 16 and, on the other hand, as the compaction spaces open, the removal of the welded strand ends is facilitated.

As the illustration of FIGS. 1 and 2 make clear, the outer end faces of the anvil 4 and the sonotrode 2, and also the end face of the casing 1, lie in a common plane, with the result that all of the compaction spaces 17 to 20 are easily equally accessible from the front side of the device.

The rotational actuation of the anvil 4 relative to the sonotrode 2, which serves for compacting and for welding the strand ends introduced into the compaction spaces, can be carried out in various ways. The first form of the embodiment of the anvil drive is illustrated in FIGS. 1 and 3. An actuating member 25, projecting beyond the outer periphery of the anvil and passing through a circumferential slit 24 of the casing 1, is fixed to the anvil 4. An operating element is attached in an articulated manner to the actuating member 25. This operating element is constructed as a two-armed hand lever 27 and is pivoted on the casing 1 by bearing pins 26. The hand lever 27 is basically curved into a half-hollow cylinder in the region of its force arm 28 and, therefore, fits well onto the outer shape of the casing 1.

The force arm 28 bears against the casing 1 via a restoring spring 29. The restoring spring 29 biases the hand lever 27 so as to open the compaction spaces, so that when the hand lever 27 is released by the hand which holds the device, the anvil 4 is rotated in the direction of the arrow 30 in FIG. 5.

Figure 4:
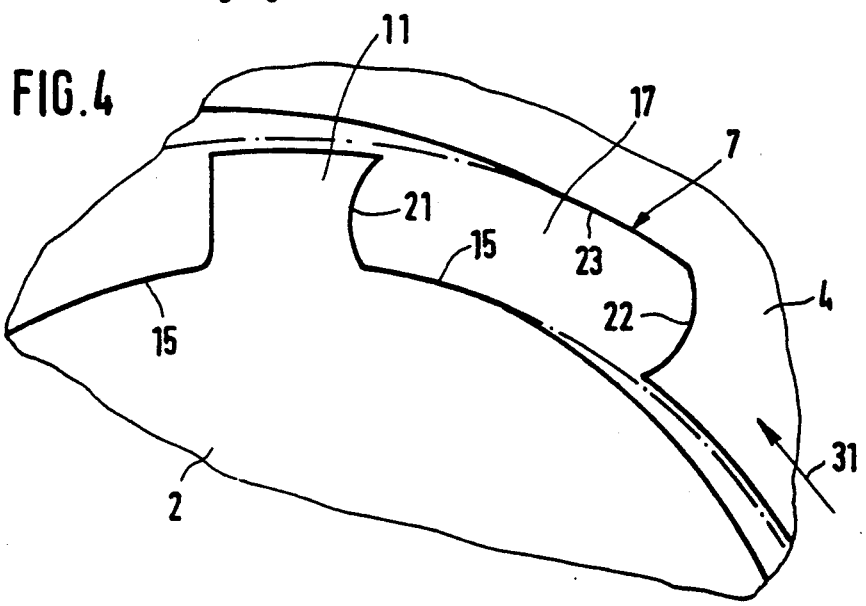
FIG. 4 illustrates an enlarged portion of FIG. 3, with an opened compaction space.
Figure 5:
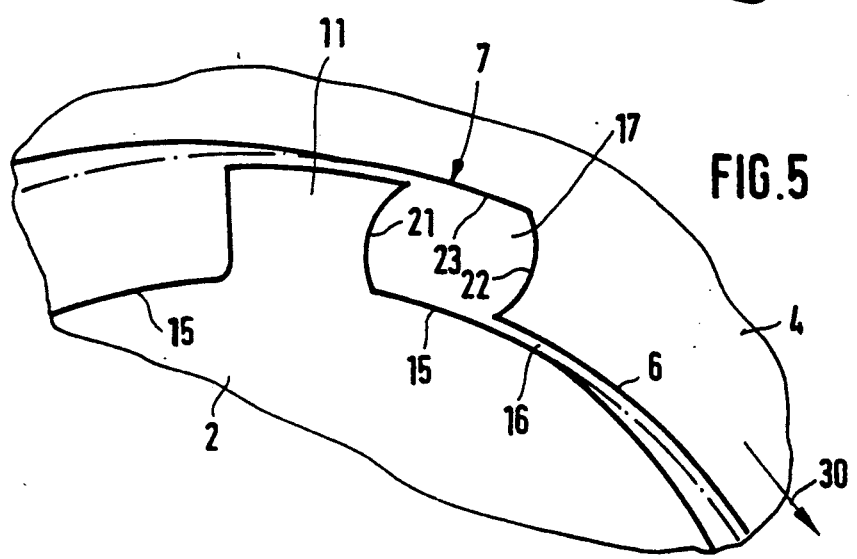
FIG. 5 illustrates a portion according to FIG. 4, with the compaction space somewhat closed.

When the force arm 28 of the hand lever 27 is pressed down against the force of the restoring spring 29, the anvil 4 is rotated in the direction of arrow 31, starting from the position illustrated in FIG. 4. The load arm 32 of the hand lever 27, acting on the actuating member 25, in the manner of a sliding link, is constructed so as to bend elastically. In the embodiment illustrated, the load arm 32 consists of two spring bars 33. This arrangement has the effect that the force arm 28 of the hand lever 27, when pressed down, i.e. pivoted towards the casing 1 about the bearing pins 26, and if a conductor end has been introduced into at least one of the compaction spaces 17 to 20, prestresses the elastic load arm 32 before the force arm 28 is stopped in its travel on a switch 34, which is mounted on the casing 1, for activating the ultrasonic action. In this manner, it is ensured that the strand end or ends are largely pre-compacted initially without ultrasonic action, by the approach of the groove lateral faces 22 to the lateral faces 21, prior to the commencement of the ultrasonic action.

The pre-compaction is completed when the force arm 28 of the hand lever 27 has been pivoted to its maximum position onto the casing 1. The spring force, which is stored in the load arm 32 in this position, has the effect that the compacted strand ends undergo a further and final compaction during the ultrasonic welding operation with the anvil 4 rotating further through a small angle about the longitudinal axis which is common with the sonotrode 2. The duration of the welding operation is predetermined by an adjustable time switch (not shown). When the hand lever 27 is released by the operator's hand, after the welding operation is completed, the compaction spaces are opened for removal of the strand ends.

Figure 6:
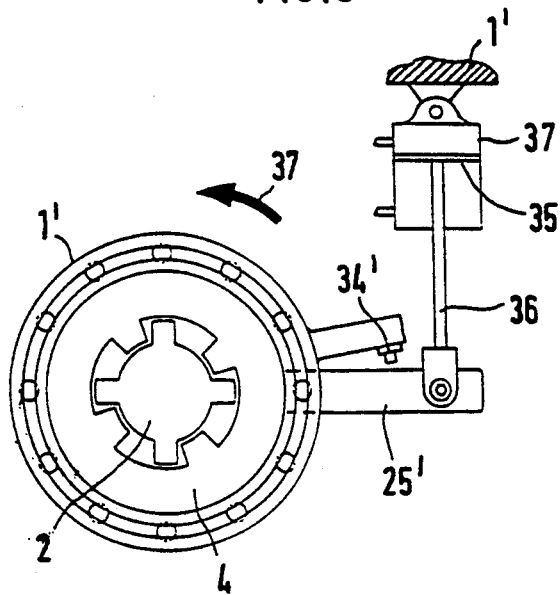
FIG. 6 illustrates another front view of the device comprising a second form of construction of the anvil drive.

FIG. 6 illustrates schematically a second embodiment of construction for the anvil drive. In FIG. 6, the actuating member 25', which is fixed to the anvil 4, is articulated to a pneumatically or hydraulically operated piston 35 or its piston rod 36. The associated cylinder 37 is connected in an articulated manner to the casing of the device. The double-acting piston-cylinder assembly 35 to 37 produces pivotal movements of the actuating member 25' and thus rotational movements of the anvil 4 relative to the coaxially arranged and stationary sonotrode 2. When the actuating member 25 is pivoted in the direction of the arrow 37, the compaction of the strand ends takes place. The action of the force is also maintained during the ultrasonic action. The ultrasonic action can be activated by a switch 34', which is mounted on the casing 1', and which is actuated by an element which causes movement of the anvil 4, for example, by the actuating member 25'.

Figure 7:
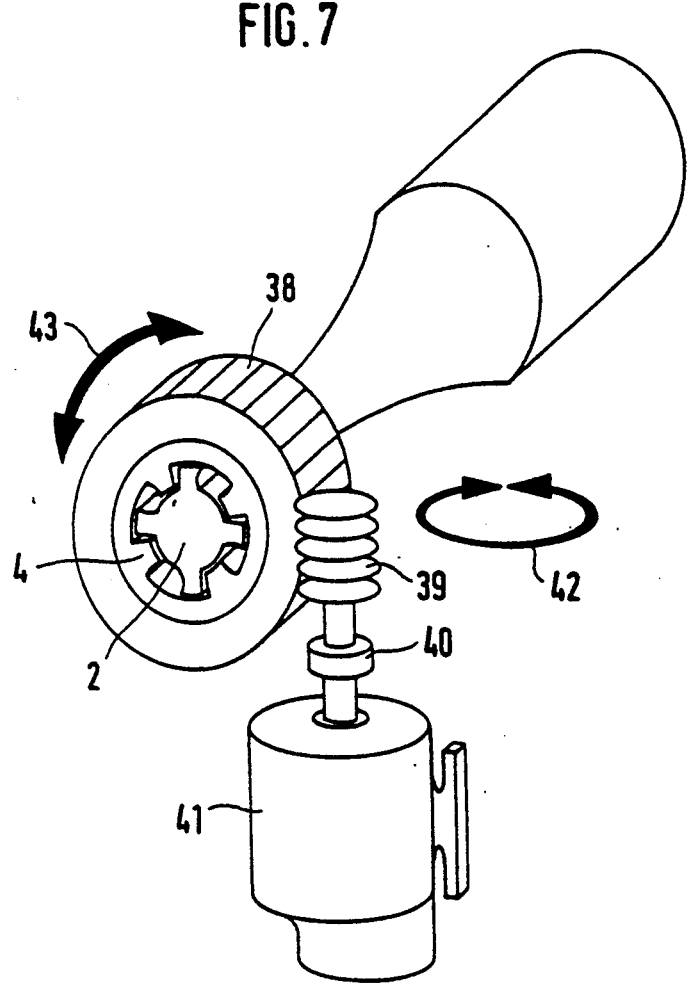
FIG. 7 illustrates a further perspective front view of the device of the present invention illustrating a third form of construction of the anvil drive.

FIG. 7 illustrates, also schematically, a third embodiment of the anvil drive. In FIG. 7, a wormgear set of teeth 38 is provided which is force-transmittingly fixed to the anvil 4 and which is also concentric with the anvil 4. This set of teeth 38 engages with a drive worm 39. The drive worm 39 is driven by an electric motor 41 through a slipping clutch 40 or other suitable device with the direction of the drive being reversible, as indicated by the circular arrow 42. As a result of this gear engagement, the anvil 4 can be driven in both the directions of rotation indicated by the arrow 43. The electric motor 41 is connected in a suitable manner with the casing (not shown) to form one common device. The ultrasonic power can, once again, be activated by a switch, which is operated by an element participating in the movement (not shown).

It is also noted that the device can, as described and illustrated in FIG. 3, have compaction spaces of different sizes. Further, several of the compaction spaces or indeed all of the compaction spaces present may, however, also be constructed having the same size, if several identical strand ends are to be welded simultaneously.

While the present invention has been described in various embodiments, such embodiments are meant to be merely illustrative of the present invention and are not to be construed as limitations thereof. Accordingly, the present invention encompasses all variations, modifications and/or alternate embodiments with the scope of the invention limited only by the claims which follow.

I claim:

1. A device for welding the ends of electrical conductors, preferably strand ends, by ultrasonics, comprising:

a sonotrode which is provided with a plurality of different projections and which is rotatable about a sonotrode longitudinal axis;

an anvil which is associated with said sonotrode and which is rotatably journalled about an anvil longitudinal axis, wherein said anvil is provided with a plurality of recesses which, together with said projections of said sonotrode, constitute compaction spaces for said ends of said electrical conductors; and a compaction chamber which has boundaries formed from two each mutually adjoining surfaces of said projections of said sonotrode and two each mutually adjoining surfaces of said recesses of said anvil, wherein said compaction chamber has a cross section which can be varied by moving said anvil relative to said sonotrode for introduction and compaction of said ends of said conductors to be welded and for a removal of the welded conductor ends, wherein said anvil is disposed with said anvil longitudinal axis coaxial with said sonotrode longitudinal axis, and further wherein a cross section of said compaction spaces can be varied by rotation of said anvil relative to said sonotrode about a common longitudinal axis.

2. The device of claim 1, wherein said anvil is constructed substantially as a hollow cylinder which is rotatably journalled about said anvil longitudinal axis which accommodates said sonotrode which is stationary therewithin, and further wherein said hollow cylinder is provided, starting from its inner circumferential surface, with groove-shaped recesses which extend parallel to said anvil longitudinal axis, wherein into each of said recesses a rib-shaped sonotrode projection, running parallel to said anvil longitudinal axis engages, projects from an outer circumferential surface of said sonotrode and an inner circumferential surface of said anvil, and further wherein said outer circumferential surface of said sonotrode is associated with each other contact-free, with a narrow gap, and further wherein a width of said groove-shaped recesses is several times greater than a width of said ribbed-shaped sonotrode projections.

3. The device of claim 1, wherein each of said compaction spaces is bounded by a lateral face of a sonotrode projection, a groove lateral face of said anvil recess opposite said lateral face, an outer circumferential surface of said sonotrode adjoining said lateral face of said sonotrode projection and a groove base surface of said anvil recess adjoining said groove lateral face.

4. The device of claim 3, wherein at least one of a plurality of distances between said lateral faces of said sonotrode projections and said groove lateral faces of said anvil recess associated therewith and a height of said sonotrode projections and a depth of said anvil recesses associated therewith are of different sizes for achieving compaction spaces of different cross sections in each relative rotational position of said anvil and said sonotrode.

5. The device of claim 3, wherein said lateral faces of said sonotrode projections and said groove lateral faces opposite thereto are shaped to a concave curvature in a radial direction which is a common longitudinal axis of said anvil and said sonotrode.

6. The device of claim 4, wherein said lateral faces of said sonotrode projections and said groove lateral faces opposite thereto are shaped to a concave curvature in a radial direction which is a common longitudinal axis of said anvil and said sonotrode.

7. The device of claim 1, wherein, in a region of said compaction spaces, at least one of said outer circumferential surfaces of said sonotrode, adjoining said lateral faces of said sonotrode projections, and a groove base surface of said anvil, adjoining said groove lateral faces, are curved inwardly and outwardly, respectively, as a deviation from a cylindrical shape in such a manner that a radial gap width between said anvil and said sonotrode becomes smaller as said groove lateral faces approach said lateral faces of said sonotrode projections, and further wherein said radial gap widths become larger in a reverse direction.

8. The device of claim 3, wherein, in a region of said compaction spaces, at least one of said outer circumferential surfaces of said sonotrode, adjoining said lateral faces of said sonotrode projections, and a groove base surface of said anvil, adjoining said groove lateral faces, are curved inwardly and outwardly, respectively, as a deviation from a cylindrical shape in such a manner that a radial gap width between said anvil and said sonotrode becomes smaller as said groove lateral faces approach said lateral faces of said sonotrode projections and further wherein said radial gap widths become larger in a reverse direction.

9. The device of claim 4, wherein, in a region of said compaction spaces, at least one of said outer circumferential surfaces of said sonotrode, adjoining said lateral faces of said sonotrode projections, and a groove base surface of said anvil, adjoining said groove lateral faces, are curved inwardly and outwardly, respectively, as a deviation from a cylindrical shape in such a manner that a radial gap width between said anvil and said sonotrode becomes smaller as said groove lateral faces approach said lateral faces of said sonotrode projections and further wherein said radial gap widths become larger in a reverse direction.

10. The device of claim 1, wherein an outer end face of said anvil and an outer end face of said sonotrode lie in one common plane.

11. The device of claim 1, wherein said anvil is journalled with an outer circumferential surface thereof by means of rolling contact bearings which are rotatable on a casing which surrounds said anvil and which surrounds said sonotrode.

12. The device of claim 1, further comprising:
an actuating member which projects beyond an outer circumference of said anvil wherein said actuating member is fixed to said anvil and further wherein an operating element which is mounted on a casing is articulated to said actuating member for rotating said anvil about said anvil longitudinal axis.

13. The device of claim 12, wherein said operating element is a two-armed hand lever which is pivotally mounted on said casing and further wherein a force arm bears against said casing via a restoring spring and further wherein a load arm which acts on said actuating member is of a flexible construction.

14. The device of claim 13, wherein said hand lever further comprises a force arm which prestresses a flexibly constructed load arm before said force arm comes to an end of its travel on a switch, which switch is mounted on said casing for an activation of an ultrasonic action when a conductor end is laid in at least one of said compaction spaces.

15. The device of claim 12, further comprising:
a piston which is one of pneumatically and hydraulically actuated wherein said piston is articulated to said actuating member.

16. The device of claim 1, wherein said anvil is connected concentrically to a set of teeth which is force-transmittingly connected to said anvil and further wherein a motor driven element engages said set of teeth.

17. The device of claim 16, wherein said set of teeth is a wormgear set of teeth.

18. The device of claim 16, wherein said motor driven element is a drive worm.

* * * * *